United States Patent
Lee et al.

(10) Patent No.: US 10,788,140 B2
(45) Date of Patent: Sep. 29, 2020

(54) SOLENOID VALVE FOR CONTROLLING GAS SUPPLY

(71) Applicants: HYUNDAI MOTOR COMPANY, Seoul (KR); KIA MOTORS CORPORATION, Seoul (KR)

(72) Inventors: Nam Woo Lee, Hwaseong-si (KR); Se Kwon Jung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 34 days.

(21) Appl. No.: 16/193,170

(22) Filed: Nov. 16, 2018

(65) Prior Publication Data
US 2020/0018414 A1    Jan. 16, 2020

(30) Foreign Application Priority Data
Jul. 16, 2018    (KR) .................. 10-2018-0082095

(51) Int. Cl.
*F16K 31/02*    (2006.01)

(52) U.S. Cl.
CPC .................... *F16K 31/02* (2013.01)

(58) Field of Classification Search
CPC ..... Y10T 137/86622; Y10T 137/87217; F16K 31/0686; F16K 31/0693; F16K 39/022; H01M 8/04201; H01M 8/04089; H01M 8/04753
USPC .................. 251/129.07, 129.17; 137/505.18
See application file for complete search history.

(56) References Cited

U.S. PATENT DOCUMENTS

| | | | | |
|---|---|---|---|---|
| 3,606,241 A | * | 9/1971 | Bornholdt | F16K 31/0693 251/52 |
| 4,796,854 A | * | 1/1989 | Ewing | F16K 31/0693 251/129.07 |
| 5,050,642 A | * | 9/1991 | Bright | F16K 31/0631 137/625.65 |
| 5,188,337 A | * | 2/1993 | Mertens | G05D 16/0672 251/129.17 |
| 5,584,467 A | * | 12/1996 | Harnett | F02D 21/02 123/527 |
| 6,082,705 A | * | 7/2000 | Arvidsson | A61M 16/204 251/129.07 |
| 6,752,169 B2 | * | 6/2004 | Callies | F16K 17/0413 137/495 |

(Continued)

FOREIGN PATENT DOCUMENTS

| | | |
|---|---|---|
| JP | H11-230403 A | 8/1999 |
| JP | 2004-293695 A | 10/2004 |

(Continued)

*Primary Examiner* — Matthew W Jellett
(74) *Attorney, Agent, or Firm* — Brinks Gilson & Lione

(57) ABSTRACT

A solenoid valve is provided to control a gas supply pressure such as a hydrogen supply valve of a fuel cell system. In particular, the solenoid valve includes: a valve body including a nozzle and a valve chamber, a nozzle opening/closing sheet, and a gas bypass hole formed on the valve body to communicate with a valve chamber of the valve body when the nozzle is closed and supply gas to a first chamber of the valve chamber through the gas bypass hole. With this arrangement, the solenoid valve may inhibit gas leak that can occur in the nozzle due to a diameter error of the nozzle due to a production deviation and a production deviation of a regulator.

15 Claims, 11 Drawing Sheets

(56) References Cited

U.S. PATENT DOCUMENTS

| | | | |
|---|---|---|---|
| 7,481,412 B2* | 1/2009 | Ishikawa | F16K 31/0658 |
| | | | 251/30.04 |
| 9,371,931 B2* | 6/2016 | Vrolijk | F23N 1/042 |
| 10,030,785 B2* | 7/2018 | Jung | H01M 8/04126 |
| 2005/0118475 A1* | 6/2005 | Ueda | H01M 8/04089 |
| | | | 429/444 |

FOREIGN PATENT DOCUMENTS

| | | |
|---|---|---|
| JP | 2008-045666 A | 2/2008 |
| JP | 2009-068648 A | 4/2009 |
| KR | 10-1113285 B1 | 1/2012 |
| KR | 10-2015-0110201 | 10/2015 |

* cited by examiner

FIG. 1 "PRIOR ART"

CURRENT IS SUPPLIED TO SOLENOID BUT BEFORE OPENING
/CLOSING SHEET MOVES UPWARDS

CURRENT IS SUPPLIED TO SOLENOID AND AFTER OPENING
/CLOSING SHEET MOVES UPWARDS

SOLENOID VALVE FOR CONTROLLING GAS SUPPLY

CROSS-REFERENCE TO RELATED APPLICATION

This application claims priority to and the benefit of Korean Patent Application No. 10-2018-0082095, filed on Jul. 16, 2018, the entire contents of which are incorporated herein by reference.

FIELD

The present disclosure relates to a solenoid valve capable of controlling a gas supply pressure such as a hydrogen supply valve of a fuel cell system.

BACKGROUND

The statements in this section merely provide background information related to the present disclosure and may not constitute prior art.

A fuel cell is a device for producing electricity by a chemical reaction between hydrogen and oxygen. A fuel cell system using such a fuel cell uses a hydrogen supply valve, etc. in order to control the supply of hydrogen gas supplied to the fuel cell.

The hydrogen supply valve includes a nozzle that can discharge hydrogen gas into the fuel cell, an opening/closing sheet that can open and close the nozzle, and a spring member for providing an operating force (an operating force for closing the nozzle) on the opening/closing sheet, and can control the pressure of the hydrogen gas supplied to the fuel cell by opening and closing the nozzle.

We have discovered that in such a hydrogen supply valve, a diameter size error of the nozzle occurs during the production process thereof, and the force of the hydrogen gas acting on the opening/closing sheet varies depending on the error changes. The force acting on the opening/closing sheet by the hydrogen gas can be expressed as a value (pressure× area) calculated by multiplying the 'pressure' of the hydrogen gas acting on the opening/closing sheet by the 'area' of the opening/closing sheet on which the pressure acts.

Then, the pressure of the hydrogen gas supplied to the hydrogen supply valve also changes. Accordingly, the pressure is reduced to a certain level using a high-pressure hydrogen regulator stored in a hydrogen storage tank and supplied to the hydrogen supply valve. We have also discovered that since the regulator also has an error, the force of the hydrogen gas acting on the opening/closing sheet varies according to the regulator mounted on the hydrogen storage tank.

Since there is an error between the hydrogen supply valve and the regulator as described above, when the operating force provided by the spring member to the opening/closing sheet is insufficient, the nozzle cannot be air-tightly closed by the opening/closing sheet, and in this case, hydrogen leak occurs between the nozzle and the opening/closing sheet.

In order to prevent the hydrogen leak as described above, when the operating force provided by the spring member to the opening/closing sheet is increased, we have discovered that the operating force of the opening/closing sheet for opening the nozzle has to be also increased, and accordingly, there is a problem in that the size of the solenoid providing the operating force and the amount of current applied to the solenoid have to be increased.

In addition, in order to manufacture the hydrogen supply valve that can flow hydrogen having a higher flow rate than now in the future, the diameter of the nozzle has to be increased, and in the conventional hydrogen supply valve, there is a problem in that as the diameter of the nozzle increases, the size of the spring member providing the operating force on the opening/closing sheet and that of the solenoid have to be also increased.

The above information disclosed in this Background section is only for enhancement of understanding of the background of the disclosure and accordingly it can contain information that does not form the prior art that is already known to a person of ordinary skill in the art.

SUMMARY

The present disclosure provides a solenoid valve for controlling gas supply, which can form a gas bypass hole that can communicate with a valve chamber of a valve body enclosed when closing a nozzle on the valve body, and supply gas to a first chamber of the valve chamber through the gas bypass hole, thus inhibiting or preventing gas leak that can occur in the nozzle due to a diameter error of the nozzle by a production deviation and a production deviation of a regulator.

In one form of the present disclosure, a solenoid valve for controlling gas supply (a first solenoid valve) includes: a valve body including a nozzle for discharging gas flowed in through a gas inflow path to a gas usage device and a valve chamber adjacent to the nozzle; a nozzle opening/closing unit movably installed in the valve chamber in a direction of opening the nozzle, and configured to divide the valve chamber into a first chamber configured to maintain communication with the gas inflow path and a second chamber configured to selectively communicate with the nozzle; a gas bypass hole formed on the valve body and configured to cause communication between the gas inflow path and the first chamber; and a solenoid configured to selectively provide an operating force of the nozzle opening/closing unit for opening the nozzle.

According to one form of the present disclosure, in the first solenoid valve, a spring member for always providing an operating force of the nozzle opening/closing unit for closing the nozzle can be interposed between the valve body and the nozzle opening/closing unit. Then, the nozzle opening/closing unit may include a stem unit movably installed in the valve chamber by receiving the operating force for opening the nozzle from the solenoid; a diaphragm located on a central portion of the stem unit, and configured to divide the valve chamber into the first chamber and the second chamber; and an opening/closing sheet fixed to an end portion of the stem unit, and configured to close the nozzle when the operating force received from the solenoid is removed and the stem unit moves in a direction of closing the nozzle. In this time, the diaphragm can be formed to be extended in a direction perpendicular to a movement direction of the stem unit, and can be joined to the central portion of the stem unit by penetrating the stem unit. In addition, the stem unit may include a first stem and a second stem that are joined with the diaphragm interposed therebetween.

In another form of the present disclosure, a surface area of the diaphragm where a gas pressure of the first chamber acts can be equal to or greater than an amount of increase of a cross-sectional area of the nozzle based on a diameter maximum error of the cross-sectional area of the nozzle or can be greater than the cross-sectional area of the increased amount. According to another form of the present disclosure, the surface area of the diaphragm where the gas pressure of the first chamber acts can be equal to or greater than the surface area of the opening/closing sheet where the gas pressure of the nozzle acts or can be greater than the surface area of the opening/closing sheet, and the surface area of the opening/closing sheet where the gas pressure of the nozzle acts can be the same as the cross-sectional area of the nozzle.

In addition, the diaphragm may have an edge portion fixed to the valve body by a fixing body installed on the valve body, and a central portion of the diaphragm is integrally movable with the stem unit while penetrating a center hole formed on the fixing body.

In addition, according to an form of the present disclosure, the first chamber can be configured as an enclosed type chamber that is communicated with the gas inflow path through the gas bypass hole, and the diaphragm can be configured as a plate-type elastic member that is deformable in response to the movement of the stem unit.

In addition, the present disclosure provides a solenoid valve for controlling gas supply (a second solenoid valve) including: a valve body having a nozzle for receiving gas for discharging to a gas inlet of a gas usage device and a valve chamber adjacent to the nozzle; a nozzle opening/closing unit movably installed in the valve chamber in the direction of opening the nozzle, and capable of dividing the valve chamber into a first chamber that is communicated with the gas inlet and a second chamber (i.e., a chamber excluding the first chamber); a gas bypass hole formed on the valve body, and for providing gas supplied from the gas inlet to the first chamber; and a solenoid installed on the valve body, and for providing a magnetic force configured to move the nozzle opening/closing unit when a current is supplied.

According to an exemplary form of the present disclosure, the nozzle opening/closing unit of the second solenoid valve may include: a stem unit for receiving a magnetic force from the solenoid, pressurized in the direction of opening the nozzle by the gas supplied to the nozzle, and pressurized in the direction of closing the nozzle by the gas supplied to the first chamber; and a first diaphragm located on the center of the stem unit, and for separating the first chamber from the second chamber. The nozzle opening/closing unit can include: a second diaphragm configured to divide the second chamber into a third chamber and a fourth chamber, the third chamber can be selectively communicated with the nozzle, and the fourth chamber can be interposed between the first chamber and the third chamber. The first chamber can be an enclosed space that is communicated with the gas bypass hole, and the fourth chamber can be an enclosed space that is surrounded by the first diaphragm and the second diaphragm inside the valve body. Then, the first diaphragm and the second diaphragm are located on the center of the stem unit with respect to the movement direction of the stem unit. The second diaphragm is located to be spaced at a certain interval apart from the first diaphragm with respect to the movement direction of the stem unit. An edge portion of the first diaphragm and an edge portion of the second diaphragm are fixed to the valve body. In addition, the first chamber is provided with a first spring member for pressurizing the stem unit in the direction of closing the nozzle, and the fourth chamber is provided with a second spring member for pressurizing the stem unit in the direction of opening the nozzle. In addition, the direction and magnitude of the magnetic force supplied to the stem unit are determined by controlling the direction and magnitude of the current supplied to the solenoid.

The first solenoid valve in accordance with the present disclosure is configured so that the nozzle opening/closing unit can be pressurized in the direction of closing the nozzle by pressure of the gas supplied to the first chamber when the nozzle opening/closing unit is pressurized in the direction of opening the nozzle by the pressure of the gas supplied to the nozzle, thus inhibiting or preventing gas leak occurring between the nozzle and the opening/closing sheet even if the unintended diameter error of the nozzle such as a production deviation occurs. Accordingly, it is unnecessary to change the sizes of the spring member and/or the solenoid even if the diameter of the nozzle of the first solenoid valve is different from a predetermined diameter, and in addition, it is possible to change the diameter of the nozzle without changing the design for coping with the change in the diameter of the nozzle if necessary.

Meanwhile, the second solenoid valve in accordance with the present disclosure is configured so that the nozzle can be opened when the pressure at the gas inlet side of the gas usage device using the gas supplied by the second solenoid valve is reduced and the nozzle can be closed when the pressure at the gas inlet side is increased, thus controlling the direction and magnitude of current supplied to the solenoid to automatically control the pressure of the gas supplied to the gas inlet to the target pressure. As a result, it is possible to prevent gas leak of the nozzle due to a production deviation of the regulator installed at the upstream side of the second solenoid valve.

Other aspects and forms of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
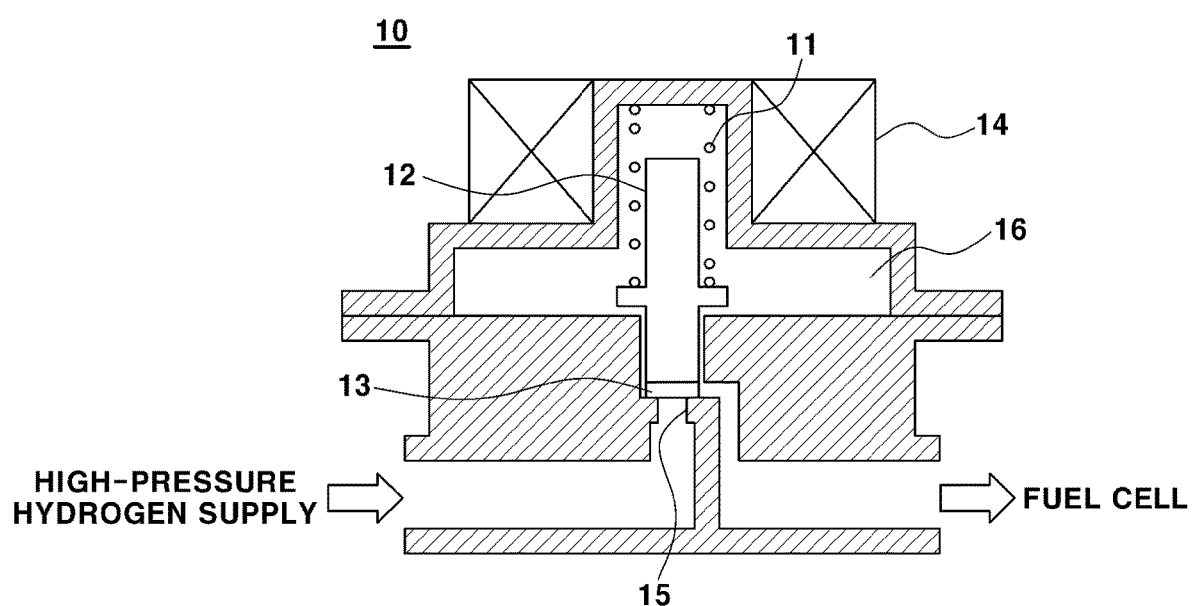
FIG. 1 is a diagram illustrating a conventional solenoid valve.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment.

First, an operation mechanism of a conventional solenoid valve will be described with reference to FIGS. 1 and 2A-2C.

As illustrated in FIG. 1, a conventional solenoid valve 10 is configured so that a spring member 11 can pressurize a stem 12 and the stem 12 pressurizes an opening/closing sheet 13, thus preventing the hydrogen supplied at high pressure from flowing to the hydrogen inlet side of a fuel cell.

Figure 2:
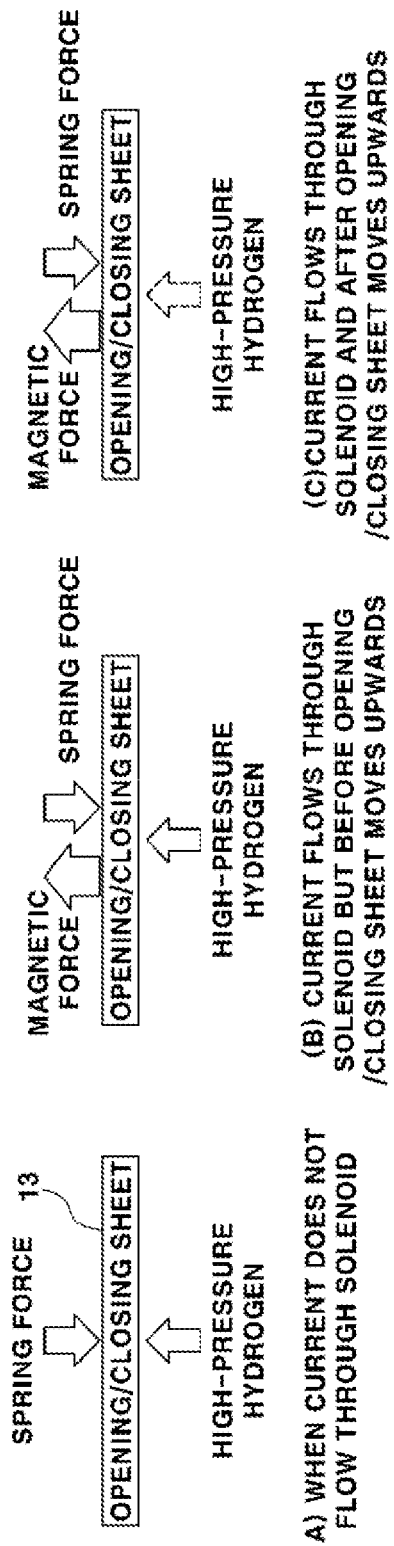
FIGS. 2A-2C are diagrams each illustrating a force acting on an opening/closing sheet of the conventional solenoid valve.

Then, the pressure applied to the opening/closing sheet 13 during the ON operation for opening the solenoid valve 10 can be illustrated as in FIG. 2. As illustrated in FIG. 2, the pressure applied to the opening/closing sheet 13 can be classified into when no current flows through the solenoid 14 (the valve closed state), before the current flows through the solenoid 14 and the opening/closing sheet 13 is raised to be separated from a nozzle 15, and after the solenoid 14 is energized by a current and the opening/closing sheet 13 is raised to be separated from the nozzle 15.

The force applied to the surface (the bottom surface) of the opening/closing sheet 13 facing the nozzle 15 due to the pressure of high-pressure hydrogen gas supplied to the nozzle 15 side is proportional to a value obtained by multiplying the pressure of the high-pressure hydrogen gas by the cross-sectional area of the nozzle 15. In order for the opening/closing sheet 13 to be in close contact with the nozzle to maintain the closed state when no current flows through the solenoid 14, the spring member 11 located on the opposite side of the nozzle 15 with respect to the opening/closing sheet 13 has a predetermined spring force and the spring force is set to be greater than the highest pressure of the high-pressure hydrogen gas supplied to the nozzle 15 side (see FIG. 2A). Then, when a current is supplied to the solenoid 14, a magnetic force generated as the current flows through the solenoid 14 is applied to the stem 12 (see FIG. 2B). When the sum of the magnetic force and the spring force is greater than a force acting on the bottom surface of the opening/closing sheet 13 (a force acting by the high-pressure hydrogen gas supplied to the nozzle side), the opening/closing sheet 13 is raised and opens the nozzle 15. When the opening/closing sheet 13 opens the nozzle 15, a valve chamber 16 above the nozzle 15 instantaneously receives wholly the same pressure as the pressure of the high-pressure hydrogen gas and the influence of the force acting on the bottom surface of the opening/closing sheet 13 is canceled and disappears (see FIG. 2C). Thereafter, in order to close the nozzle 15, the current supply to the solenoid 14 is stopped. Then, the stem 12 moves downwards by the elastic restoring force of the spring member 11 and the opening/closing sheet 13 at the lower end of the stem 12 closes while covering the nozzle 15 (see FIG. 1).

Meanwhile, there is a problem in that in the production process of the solenoid valve 10, an error in the size of diameter of the nozzle 15 occurs, and the force of the hydrogen gas acting on the opening/closing sheet 13 varies according to the error. Then, the pressure of the hydrogen gas supplied to the valve 10 also changes. Accordingly, the high-pressure hydrogen stored in a hydrogen storage tank (which is much higher than the hydrogen pressure supplied to the fuel cell, the highest 700 bar) is decompressed to a certain level using a regulator and supplied to the valve 10. However, since the regulator also has a production error, there is also a problem in that the force of the hydrogen gas acting on the opening/closing sheet 13 varies according to the regulator mounted on the hydrogen storage tank.

Since the production errors of the valve 10 and the regulator are present, when the operating force supplied by the spring member 11 to the opening/closing sheet 13 is insufficient, the nozzle 15 cannot be air-tightly closed by the opening/closing sheet 13, and in this case, hydrogen leak occurs between the nozzle 15 and the opening/closing sheet 13.

Accordingly, when the spring member 11 increases the operating force provided to the opening/closing sheet 13 in order to prevent the hydrogen leak, the operating force of the opening/closing sheet 13 for opening the nozzle 15 has to be also increased, and accordingly, there is a problem in that the size of the solenoid 14 providing the operating force and/or the amount of current applied to the solenoid 14 have to be increased.

Accordingly, the present disclosure provides a solenoid valve, which can form a gas bypass hole that can communicate with a valve chamber of a valve body enclosed when the nozzle is closed on the valve body and supply gas to a first chamber of the valve chamber through the gas bypass hole, thus preventing gas leak occurring in the nozzle due to a diameter error of the nozzle by a production deviation and a production deviation of the regulator.

Figure 3:
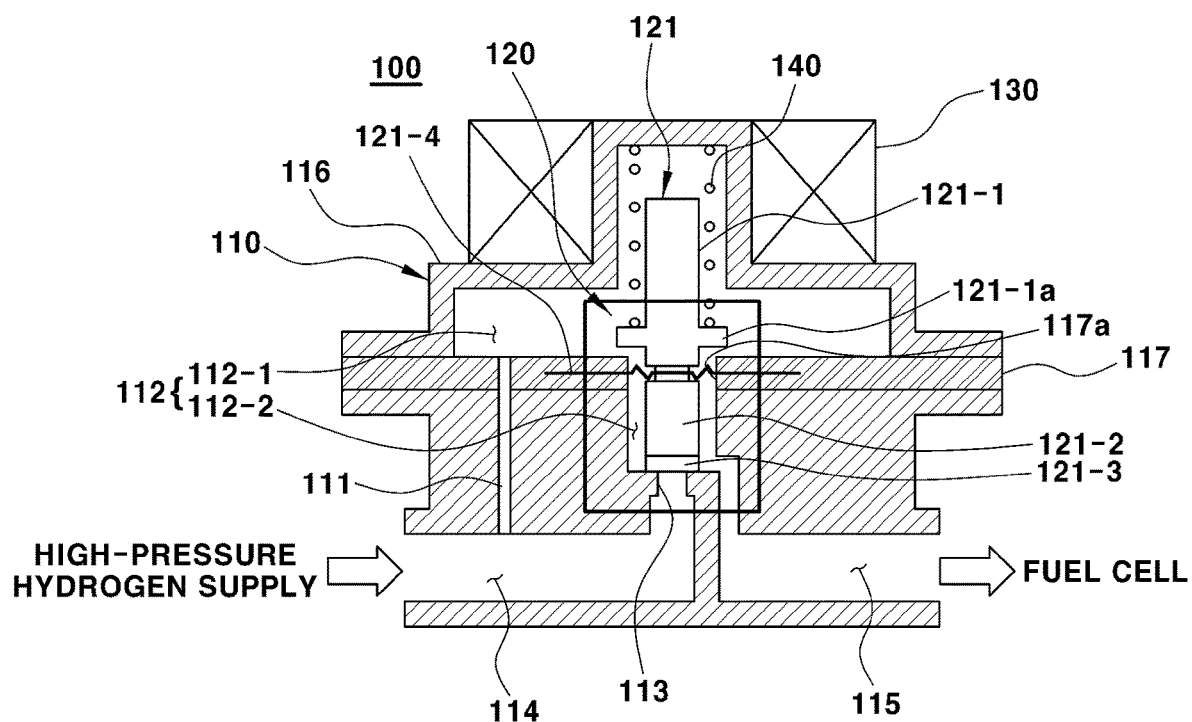
FIG. 3 is a diagram illustrating a solenoid valve in a first form of the present disclosure.
Figure 4A:
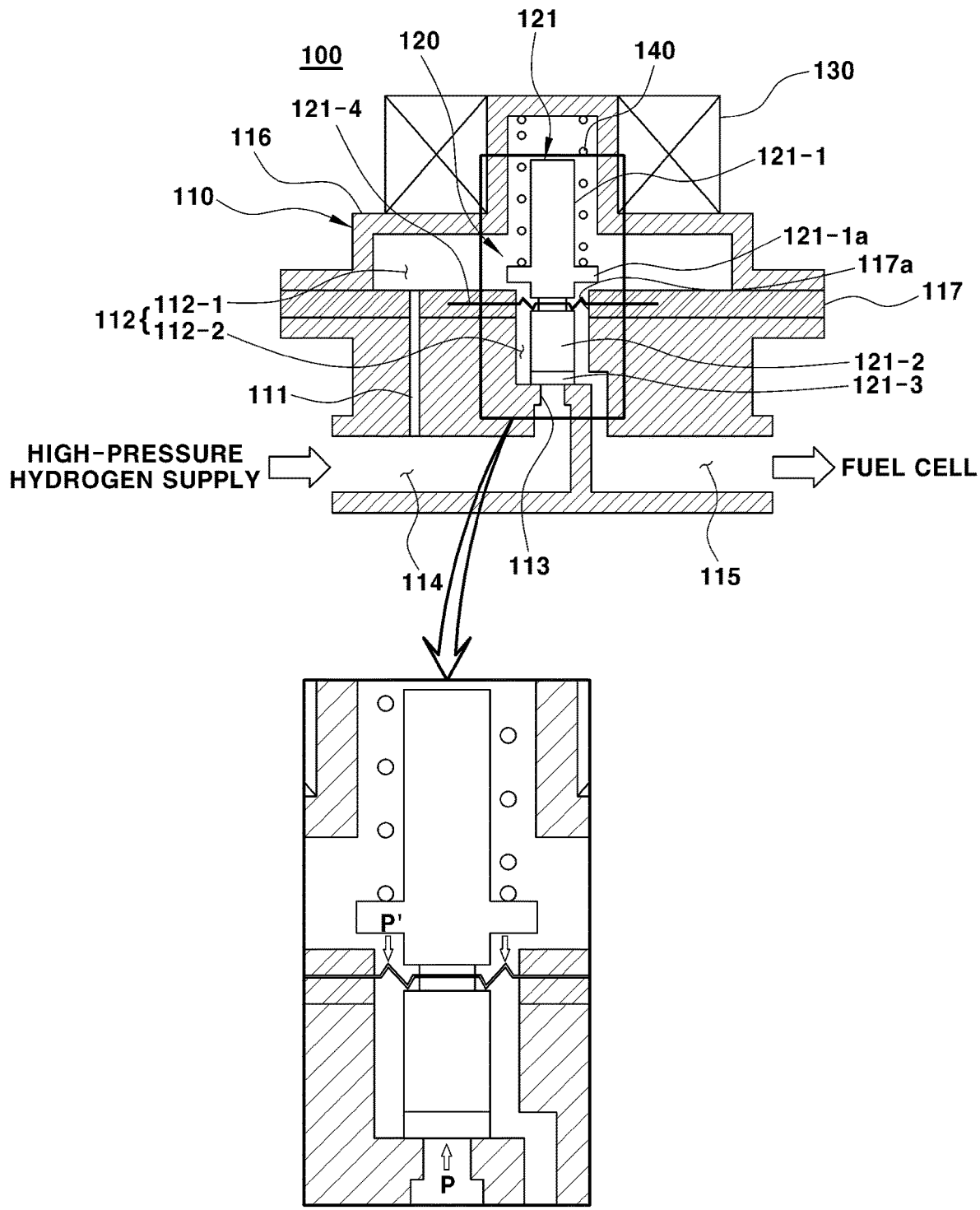
FIG. 4A is a diagram illustrating a force acting on a nozzle opening/closing unit before opening the solenoid valve in the first form of the present disclosure.
Figure 4B:
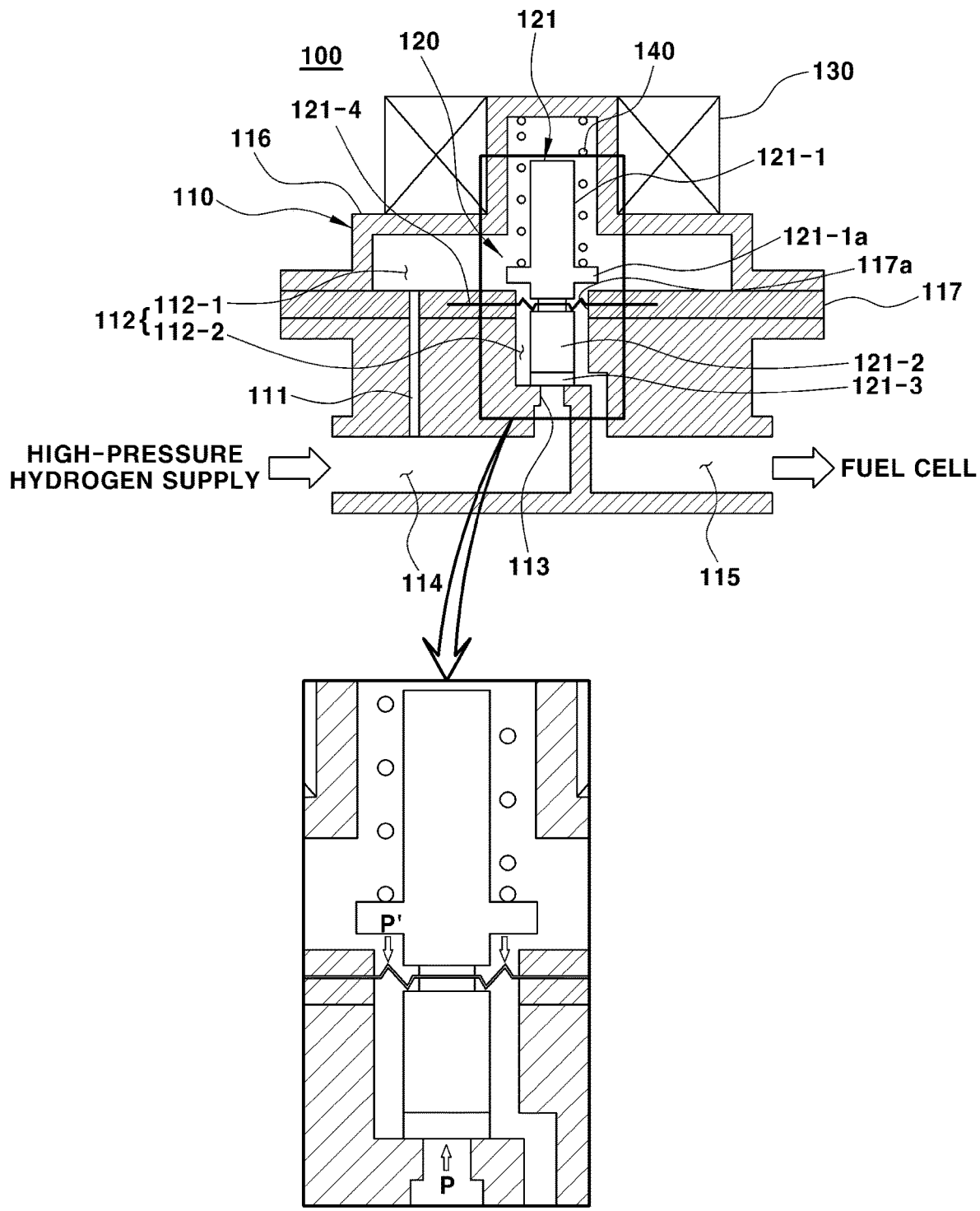
FIGS. 4B and 4C are diagrams illustrating a force acting on the nozzle opening/closing unit in supplying a current for opening the solenoid valve in the first form of the present disclosure.
Figure 4C:
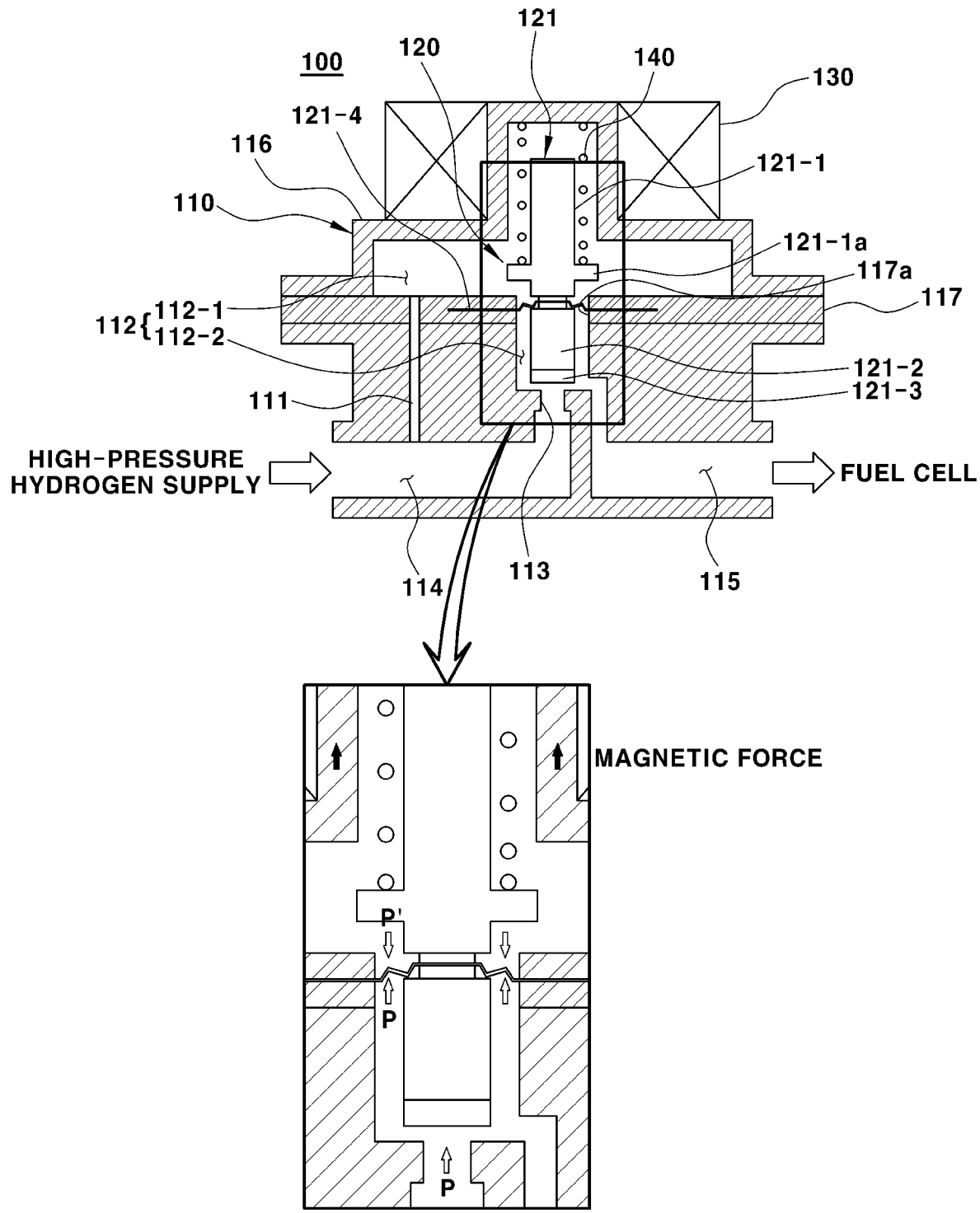
Figure 5:
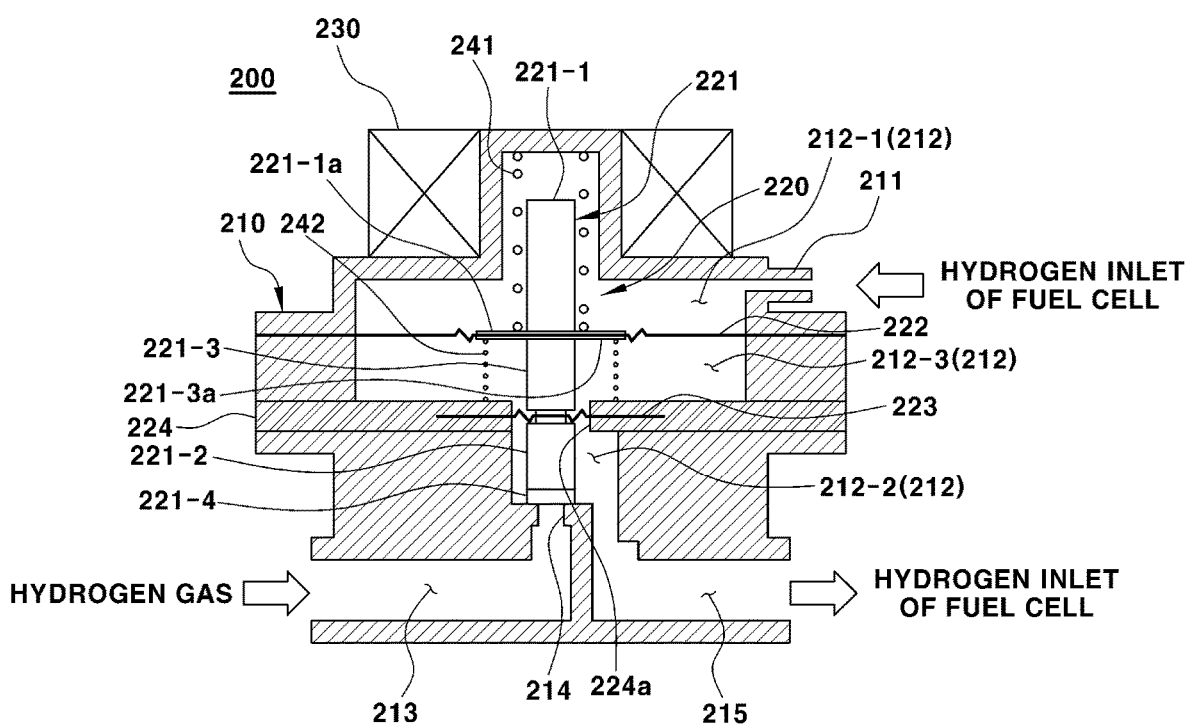
FIG. 5 is a diagram illustrating a solenoid valve in accordance with a second form of the present disclosure.

FIG. 3 is a diagram illustrating a solenoid valve (a first solenoid valve) in a first form of the present disclosure, FIG. 4A is a diagram illustrating a force acting on a nozzle opening/closing unit before opening the first solenoid valve, and FIGS. 4B and 4C are diagrams illustrating a force acting on the nozzle opening/closing unit when supplying a current for opening the first solenoid valve. In addition, FIG. 5 is a diagram illustrating a solenoid valve (a second solenoid valve) in a second form of the present disclosure, and FIGS. 6A to 6D are diagrams illustrating a force acting on the nozzle opening/closing unit of the second solenoid valve.

Hereinafter, the present disclosure will be described with reference to FIGS. 3 to 6D so that those skilled in the art can easily carry out the present disclosure. In this specification, the vertical and horizontal directions are illustrated with reference to FIGS. 3 to 6D, and the direction of movement of the stem unit for opening and closing the nozzle is matched with the vertical direction.

First, a solenoid valve (the first solenoid valve) in accordance with a first form of the present disclosure will be described with reference to FIGS. 3 to 4C.

As illustrated in FIG. 3, the first solenoid valve 100 can be configured to include a valve body 110 having a gas bypass hole 111, a nozzle opening/closing unit 120 installed inside the valve body 110, and a solenoid 130 and a spring member 140 for providing operating force to the nozzle opening/closing unit 120, etc.

The valve body 110 has a gas inflow path 114 through which hydrogen gas flows and a nozzle 113 through which the hydrogen gas flowed in through the gas inflow path 114 is discharged to the fuel cell side, and has a valve chamber 112 that can communicate with the nozzle 113 when the nozzle 113 is opened. The gas inflow path 114 can be located on the lower portion of the valve body 110, and the nozzle 113 can be located on the downstream side end portion (the rear end portion) of the gas inflow path 114 with respect to the flow direction of the hydrogen gas flowing through the gas inflow path 114. The nozzle 113 is for discharging gas into a gas usage device (e.g., a fuel cell, etc.) using hydrogen gas, and can be formed of a hole type having a certain diameter. Then, the valve chamber 112 can be located on the upper portion of the valve body 110 in order to be adjacent to the nozzle 113, and can be located on the upper portions of the gas inflow path 114 and the nozzle 113. In addition, the valve body 110 can include a gas discharge path 115 located on the opposite side of the gas inflow path 114 with respect to the nozzle 113. The gas discharge path 115 can communicate with the nozzle 113 when the nozzle 113 is opened, and can be located on the lower portion of the valve body 110. In addition, the valve body 110 can be formed with a gas bypass hole 111 (or a bypass flow path) located by extending between the gas inflow path 114 and the valve chamber 112.

The nozzle opening/closing unit 120 is vertically, movably installed in the valve chamber 112 in order to open and close the nozzle 113, and when it is installed in the valve chamber 112, the valve chamber 112 can be divided into a first chamber 112-1 at the upper side thereof and a second chamber 112-2 at the lower side thereof. In this time, the first chamber 112-1 is adjacent to the gas inflow path 114 so that the boundary thereof are in contact with each other, and the second chamber 112-2 is adjacent to the nozzle 113 so that the boundary thereof are in contact with each other. In addition, the first chamber 112-1 is always adjacent to the gas inflow path 114 through the gas bypass hole 111, and the second chamber 112-2 is selectively adjacent to the nozzle 113 only when the nozzle 113 is opened. The first chamber 112-1 can be gas-movably connected to the gas inflow path 114 through the gas bypass hole 111, and the second chamber 112-2 can be selectively, gas-movably connected to the nozzle 113 only when the nozzle 113 is opened. The hydrogen gas flowed in through the gas inflow path 114 can be discharged to the gas discharge path 115 via the second chamber 112-2 when the nozzle 113 is opened, and can be supplied to the hydrogen inlet side of the fuel cell through the gas discharge path 115.

The gas bypass hole 111 can be formed to extend vertically between the first chamber 112-1 and the gas inflow path 114, and can be formed in a straight-line shape on the valve body 110 in order to communicate between the gas inflow path 114 and the first chamber 112-1 at the upside of the gas inflow path 114.

The nozzle opening/closing unit 120 can be composed of a stem unit 121 installed in the valve chamber 112, a diaphragm 121-4 located on the central portion of the stem unit 121, and an opening/closing sheet 121-3 fixed to the lower end of the stem unit 121.

The stem unit 121 can be composed of a first stem 121-1 at the upper side thereof and a second stem 121-2 at the lower side thereof. The first stem 121-1 and the second stem 121-2 can be arranged in the operation direction (the vertical direction) of the stem unit 121, and the diaphragm 121-4 can be located between the first stem 121-1 and the second stem 121-2. That is, the stem unit 121 can be composed of the first stem 121-1 and the second stem 121-2 that are joined with the diaphragm 121-4 interposed therebetween. Specifically, the stem unit 121 can be composed of the first stem 121-1 joined to the upper central portion of the diaphragm 121-4 and the second stem 121-2 joined to the lower central portion of the diaphragm 121-4. The diaphragm 121-4 can be formed to be extended in the direction perpendicular to the operation direction (the movement direction) of the stem unit 121. Specifically, the diaphragm 121-4 can be joined to the central portion of the stem unit 121 in the longitudinal direction by penetrating the stem unit 121, and can be fixed to the stem unit 121 to be integrally movable with the stem unit 121. The diaphragm 121-4 can be extended to the outside of the stem unit 121 to air-tightly divide the valve chamber 112 into two spaces (i.e., the first chamber and the second chamber) that cannot be gas-movable. The first chamber 112-1 and the second chamber 112-2 cannot cause gas movement with the diaphragm 121-4 interposed therebetween. Herein, the first chamber 112-1 is an enclosed type chamber communicating with the gas inflow path 114 through the gas bypass hole 111. That is, the first chamber 112-1 is a space surrounded by the upper end portion of the valve body 110 surrounding the valve body 110 and the diaphragm 121-4, and can communicate with the gas inflow path 114 outside the first chamber 112-1 through the gas bypass hole 111. Then, the opening/closing sheet 121-3 can be a sheet member of an elastic material that can close by air-tightly covering the nozzle 113 when the stem unit 121 moves downwards.

The solenoid 130 generates a magnetic force when a current is supplied and can move the stem unit 121 upward using the magnetic force, and is installed on the valve body 110 so that the magnetic force can act on the stem unit 121. A stepped portion 116 can be formed on the upper end of the valve body 110 for installing the solenoid 130, and the stepped portion 116 can be formed in a shape that surrounds the upper end portion of the stem unit 121 at certain intervals. The solenoid 130 can be located on the stepped portion 116 in a circular coil shape surrounding the upper end portion of the stem unit 121. In addition, the magnetic force can be selectively provided to the nozzle opening/closing unit 120 (when a current is supplied to the solenoid) as an operating force (an opening operating force) supplied to the nozzle opening/closing unit 120 in order to open the nozzle 113.

Then, the spring member 140 can block the upward movement of the stem unit 121 by a predetermined spring force, and can be interposed between the valve body 110 and the stem unit 121. Specifically, the spring member 140 can be interposed between a support end 121-1a formed to be protruded on the outer circumferential surface of the first stem 121-1 and an inner wall surface of the upper end of the valve body 110. In this time, the spring member 140 can be compressed by the upward movement of the stem unit 121, and can be restored by the downward movement (returning)

of the stem unit 121. The spring member 140 can be compressed when the magnetic force of the solenoid 130 acts on the stem unit 121, and the spring member 140 can be restored when the magnetic force of the solenoid 130 is removed.

The nozzle opening/closing unit 120 can maintain the closed state of the nozzle by an operating force (a closed operating force) provided by the spring member 140 until a magnetic force of the solenoid 130 is generated to affect the stem unit 121. That is, the stem unit 121 can be installed in the valve chamber 112 to always receive an operating force for closing the nozzle 113 from the spring member 140 and to selectively receive the operating force for opening the nozzle 113 from the solenoid 130. When the operating force supplied to the stem unit 121 by the solenoid 130 is removed and the operating force supplied to the stem unit 121 by the spring member 140 is maintained, the opening/closing sheet 121-3 on the lower end of the stem unit 121 closes by air-tightly covering the nozzle 113. The opening/closing sheet 121-3 is raised to be separated from the nozzle 113 when the stem unit 121 receives the operating force from the solenoid 130, and when the operating force received from the solenoid 130 is removed, the stem unit 121 moves downwards integrally with the stem unit 121 by the operating force received from the spring member 140 to be in close contact with the nozzle 113.

Herein, the spring member 140 can use a coil spring having a spring force corresponding to a critical value (a minimum load) desired for compressive deformation of the spring member 140. Then, the solenoid 130 can use a solenoid that can generate a magnetic force greater than the spring force of the spring member 140.

The first solenoid valve 100 configured as described above is configured so that the hydrogen gas flowed in through the gas inflow path 114 pressurizes the bottom surface (the lower end surface) of the opening/closing sheet 121-3 through the nozzle 113, and at the same time, the hydrogen gas is flowed into the first chamber 112-1 through the gas bypass hole 111. The hydrogen gas flowed into the first chamber 112-1 pressurizes the upper surface (the upper end surface) of the diaphragm 121-4. The pressure of the hydrogen gas that pressurizes the upper surface of the diaphragm 121-4 is delivered to the opening/closing sheet 121-3 through the second stem 121-2 and pressurizes the upper surface of the opening/closing sheet 121-3. Then, the spring force (the elastic restoring force) of the spring member 140 acting on the second stem 121-2 is delivered to the upper surface of the opening/closing sheet 121-3 through the first stem 121-1. That is, the spring force is always supplied to the upper surface of the opening/closing sheet 121-3 by the spring force of the spring member 140 supplied to the stem unit 121. The spring force that is always supplied to the stem unit 121 can be set as an initial spring force before the valve operation (the state that a current is not supplied to the solenoid and the nozzle is closed), and the spring member 140 can be installed on the valve body 110 to have an initial spring force. That is, the spring member 140 can be installed on the valve body 110 in the compressed state having the initial spring force.

Accordingly, before a current is applied to the solenoid 130, the pressure of the hydrogen gas acting through the nozzle 113 is transmitted to the bottom surface of the opening/closing sheet 121-3, but the pressure of the hydrogen gas flowed into the first chamber 112-1 through the gas bypass hole 111 together with the initial spring force of the spring member 140 simultaneously act on the upper surface the opening/closing sheet 121-3, such that the closed state (the valve closed state) of the nozzle 113 is maintained (see FIG. 4A).

Referring to FIG. 4A, the area where the pressure of the hydrogen gas acts on the bottom surface of the opening/closing sheet 121-3 can vary according to the diameter of the nozzle 113, and the area where the pressure of the hydrogen gas acts on the bottom surface of the opening/closing sheet 121-3 is the same as the cross-sectional area of the nozzle 113. The force F acting on the bottom surface of the opening/closing sheet 121-3 by the hydrogen gas is determined as a value (P×A=F) obtained by multiplying the pressure P of the hydrogen gas and the pressure P by the surface area A of the opening/closing sheet 121-3 where the pressure of the hydrogen gas acts. The first solenoid valve 100 can set the initial spring force of the spring member 140 as a value that is greater than the force F of the hydrogen gas acting on the bottom surface of the opening/closing sheet 121-3 in order to maintain the closed state of the nozzle 113 until a current is applied to the solenoid 130. However, when a diameter error of the nozzle 113 occurs due to a production deviation and the cross-sectional area of the nozzle 113 increases, the force F of the hydrogen gas can exceed the initial spring force, and in this case, hydrogen leak can occur between the nozzle 113 and the opening/closing sheet 121-3.

In the first solenoid valve 100, the pressure P' of the hydrogen gas acts on the upper surface of the diaphragm 121-4 through the gas bypass hole 111, and accordingly, the pressure of the hydrogen gas is also delivered to the upper surface of the opening/closing sheet 121-3. The force F' acting on the upper surface of the opening/closing sheet 121-3 by the hydrogen gas is a value (P'×A'=F') obtained by multiplying the pressure P' of the hydrogen gas by the surface area A' of the diaphragm 121-4 where the pressure P' of the hydrogen gas acts. Accordingly, the surface area A' of the diaphragm 121-4 where it is extended to the outside of the stem unit 121 and the pressure P' of the hydrogen gas acts can be set considering the diameter maximum error of the nozzle 113 that can occur upon producing the valve, thus preventing hydrogen leak between the nozzle 113 and the opening/closing sheet 121-3 even if a diameter error of the nozzle 113 occurs.

The pressure P' of the hydrogen gas acting on the upper surface of the diaphragm 121-4 has the same pressure value as the pressure P of the hydrogen gas acting on the bottom surface of the opening/closing sheet 121-3. Accordingly, when the surface area A' of the diaphragm 121-4 where the pressure P' of the hydrogen gas acts is set to be equal to or greater than the cross-sectional area of the nozzle of the amount increased according to the maximum diameter error of the nozzle 113, the hydrogen leak can be prevented regardless of the occurrence of the diameter error of the nozzle. That is, the minimum value of the surface area A' of the diaphragm 121-4 where the pressure P' of the hydrogen gas flowed into the first chamber 112-1 through the gas bypass hole 111 acts is determined as the cross-sectional area of the nozzle of the amount increased according to the diameter maximum error of the nozzle 113 of the cross-sectional area of the nozzle 113, the hydrogen leak between the nozzle 113 and the opening/closing sheet 121-3 can be prevented in response to the diameter error of the nozzle 113.

When it is difficult to calculate the diameter maximum error of the nozzle 113, the hydrogen leak can be prevented by setting the surface area A' of the diaphragm 121-4 where the pressure of the hydrogen gas of the first chamber 112-1 acts to be equal to or greater than the surface area A of the opening/closing sheet 121-3 where the pressure of the hydrogen gas acts through the nozzle 113 of the bottom surface of the opening/closing sheet. That is, the hydrogen leak can be prevented by setting the surface area A' of the diaphragm 121-4 where the pressure P' of hydrogen gas of the first chamber 112-1 acts to be equal to or greater than the surface area A of the opening/closing sheet 121-3 where the pressure of the hydrogen gas of the gas inflow path 114 of the bottom surface of the opening/closing sheet 121-3. The surface area A of the opening/closing sheet 121-3 where the pressure of the hydrogen gas of the gas inflow path 114 of the bottom surface of the opening/closing sheet 121-3 acts is the same as the cross-sectional area of the nozzle 113.

When the surface area A' of the diaphragm 121-4 has an area that is equal to or greater than the surface area A of the opening/closing sheet 121-3, the influence of the force F of the hydrogen gas acting on the bottom surface of the opening/closing sheet 121-3 is disappeared by the force F' of the hydrogen gas acting on the upper surface of the diaphragm 121-4, such that the opening/closing sheet 121-3 can be completely in close contact with the surface of the nozzle 113 by the initial spring force of the spring member 140, and as a result, the hydrogen leak can be prevented between the nozzle 113 and the opening/closing sheet 121-3 even if the diameter of the nozzle 113 is unintentionally increased.

Meanwhile, when a current is supplied to the solenoid 130 in the state that the nozzle 113 is closed, a magnetic force is generated inside the solenoid 130 and the magnetic force acts on the stem unit 121 (see FIG. 4B). The stem unit 121 is moved upwards by the magnetic force and the opening/closing sheet 121-3 on the lower end of the stem unit 121 is raised together with the stem unit 121 (see FIG. 4C). The magnetic force is more greatly generated in the direction opposite to the initial spring force of the spring member 140, and the stem unit 121 is raised to compress the spring member 140. In this time, the opening/closing sheet 121-3 is separated from the nozzle 113, and the pressure of the hydrogen gas (the hydrogen supplied through the gas inflow path) acts on the lower surface (the lower end surface) of the diaphragm 121-4 at the moment when the nozzle 113 is opened, and the areas of the lower surface and the upper surface of the diaphragm 121-4 where the pressure of the hydrogen gas acts are the same, such that the force of the hydrogen gas affecting the diaphragm 121-4 is canceled. That is, since the surface area (the surface area of the portion that is extended to the outside of the stem unit) where the pressure of the hydrogen gas acts of the upper surface of the diaphragm 121-4 and the surface area where the pressure of the hydrogen gas acts of the lower surface of the diaphragm 121-4 are the same, the force of the hydrogen gas pressurizing the diaphragm 121-4 is canceled when the nozzle 113 is opened. Accordingly, the nozzle opening/closing unit 120 including the opening/closing sheet 121-3 is raised by the difference between the spring force of the spring member 140 and the magnetic force of the solenoid 130. Herein, FIG. 4B illustrates the state that a current is supplied to the solenoid but before the opening/closing sheet 121-3 is yet raised, and FIG. 4C illustrates the state that a current is supplied to the solenoid 130 and accordingly, the opening/closing sheet 121-3 is raised.

Like the first solenoid valve 100, when the pressure of the hydrogen gas acts on the upper surface of the diaphragm 121-4 using the gas bypass hole 111 and the surface area of the diaphragm 121-4 where the pressure of the hydrogen gas acts is sufficiently set, in case of increasing the diameter of the nozzle 113 for a large amount of hydrogen supply as well as increasing the diameter of the nozzle 113 due to the production error of the nozzle 113, it is possible to prevent hydrogen leak between the nozzle 113 and the opening/closing sheet 121-3 without increasing the initial spring force of the spring member 140 or increasing the size and/or amount of current of the solenoid 130.

When a current is supplied to the solenoid 130 in order to open the nozzle 113, the spring member 140 is further compressed than before a current flows through the solenoid 130 and has a spring force (an elastic restoring force) greater than the initial spring force, and then, when the current supplied to the solenoid 130 is removed, the nozzle opening/closing unit 120 including the opening/closing sheet 121-3 moves downwards by the spring force, and returns to the upper end of the nozzle 113 to close the nozzle 113.

Meanwhile, as illustrated in FIG. 3, the diaphragm 121-4 can have the central portion of the diaphragm 121-4 fixed between the first stem 121-1 and the second stem 121-2 and have the edge portion of the diaphragm 121-4 fixed to the valve body 110 through a fixing body 117. The fixing body 117 is fixedly installed on the valve body 110 in the first chamber 112-1, and has a center hole 117a that the nozzle opening/closing unit 120 can penetrate on the central portion thereof. The nozzle opening/closing unit 120 is located in the valve chamber 112 through the center hole 117a. When the nozzle opening/closing unit 120 vertically moves, the central portion of the diaphragm 121-4 vertically moves in the center hole 117a (through the fixing body 117). The fixing body 117 can be located on the center of the valve chamber 112 (i.e., the lower portion of the first chamber 112-1), and the gas bypass hole 111 of the valve body 110 can be located to be extended to the fixing body 117. That is, the gas bypass hole 111 can be also formed in the fixing body 117 according to the installation location of the fixing body 117.

The diaphragm 121-4 can be a plate-like elastic member that is deformable in response to the vertical movement of the stem unit 121, and the stem unit 121 moves by the influence of the spring force generated by the spring member 140 and the magnetic force generated by the solenoid 130. The diaphragm 121-4 is integrally coupled with the fixing body 117 in order to prevent gas leak between the edge portion of the diaphragm 121-4 and the fixing body 117. For example, the diaphragm 121-4 can be coupled with the fixing body 117 in such a manner that the edge portion of the diaphragm 121-4 is air-tightly inserted into the fixing body 117. In addition, the fixing body 117 can be also molded so that the fixing body 117 surrounds the edge portion of the diaphragm 121-4 and the center hole 117a is located on the central portion of the diaphragm 121-4 during the molding of the fixing body 117. That is, the fixing body 117 can be formed integrally with the edge portion of the diaphragm 121-4.

Next, a solenoid valve (a second solenoid valve) in a second form of the present disclosure will be described with reference to FIGS. 5 to 6D.

A second solenoid valve 200, as a device that is installed on a hydrogen supply line of a gas usage device using hydrogen gas, can be interposed between a gas storage tank for storing hydrogen gas supplied to the valve 200 and the gas inlet of the gas usage device that can receive hydrogen gas from the valve 200, and can be connected to the gas inlet through an ejector, etc. The gas usage device can be a fuel cell using hydrogen gas as a fuel, and the gas inlet can be a hydrogen inlet of the fuel cell.

As illustrated in FIG. 5, the second solenoid valve 200 can be configured to include a valve body 210 having a gas bypass hole 211, a nozzle opening/closing unit 220 installed inside the valve body 210, and a solenoid 230 and spring members 241, 242 for providing an operating force to the nozzle opening/closing unit 220, etc.

The valve body 210 has a gas inflow path 213 through which hydrogen gas flows and a nozzle 214 for discharging the hydrogen gas supplied through the gas inflow path 213 to the hydrogen inlet side of the fuel cell, and has a valve chamber 212 in which the nozzle opening/closing unit 220 for opening and closing the nozzle 214 is installed. The nozzle opening/closing unit 220 can be installed inside the valve chamber 212 with the nozzle 214 closed. The gas inflow path 213 can be located on the lower portion of the valve body 210, and the nozzle 214 can be located on the downstream side end portion of the gas inflow path 213 based on the flow direction of the hydrogen gas flowing through the gas inflow path 213. The nozzle 214 can be formed in a hole type having a certain diameter. The valve chamber 212 can be located on the upper portion of the valve body 210, and can be located on the upper portions of the gas inflow path 213 and the nozzle 214. The valve body 210 can include a gas discharge path 215 located at the opposite side of the gas inflow path 213 with respect to the nozzle 214. The gas discharge path 215 can be connected to the hydrogen inlet of the fuel cell with the ejector interposed therebetween, can communicate with the nozzle 214 when the nozzle 214 is opened, and can discharge the hydrogen gas supplied through the nozzle 214 to the hydrogen inlet of the fuel cell.

In addition, the gas bypass hole 211 can be formed on the upper portion of the valve body 210. The gas bypass hole 211 communicates between the valve chamber 212 and the hydrogen inlet of the fuel cell. That is, the gas bypass hole 211 gas-movably connects the valve chamber 212 and the hydrogen inlet of the fuel cell. Specifically, the gas bypass hole 211 can be formed on the valve body 210 in order to connect the upside space (the first chamber) of the valve chamber 212 and the hydrogen inlet thereof. The gas bypass hole 211 flows the hydrogen gas supplied through the hydrogen inlet into the first chamber 212-1 of the valve chamber 212, and the hydrogen gas flowed into the first chamber 212-2 of the valve chamber 212 pressurizes the nozzle opening/closing unit 220 in the direction of closing the nozzle (downwards).

The nozzle opening/closing unit 220 can be configured to include a stem unit 221 installed in the valve chamber 212 with the nozzle 214 closed, and a first diaphragm 222 and a second diaphragm 223 located on the center of the stem unit 221.

The stem unit 221 closes the nozzle 214 while being stacked on the upper end of the nozzle 214, and is installed in the valve chamber 212 to be movable in the direction of opening and closing the nozzle 214. The stem unit 221 can be pressurized in the direction (upwards) of opening the nozzle 214 by the hydrogen gas supplied to the nozzle 214 when the nozzle 214 is closed. The stem unit 221 can be composed of a plurality of stems 221-1, 221-2, 221-3 arranged in a line along the movement direction of the stem unit 221 for opening and closing the nozzle 214, and an opening/closing sheet 221-4 fixed to the lower end of the stem 221-3 located on the distal end of the stems 221-1, 221-2, 221-3. Specifically, the stem unit 221 can be composed of a first stem 221-1 at the upper side thereof, a second stem 221-2 at the lower side thereof, and a third stem 221-3 on the center thereof interposed between the first stem 221-1 and the second stem 221-2. The opening/closing sheet 221-4 can be attached to the lower end of the second stem 221-2, and can be in close contact with the upper end of the nozzle 214 when the nozzle 214 is closed.

The stem unit 221 can move in the direction (the vertical direction) of opening and closing the nozzle 214 by the magnetic force generated by the solenoid 230. The magnetic force can be provided to and influence the stem unit 221 when a current is supplied to the solenoid 230.

A first support end 221-1a that can support the lower end of the first spring member 241 can be formed on the lower end of the first stem 221-1, and a second support end 221-3a that can support the upper end of the second spring member 242 can be formed on the upper end of the second spring member 242. The first support end 221-1a can be horizontally (the direction perpendicular to the movement direction of the stem unit) extended and formed to be protruded on the lower end of the first stem 221-1, and the second support end 221-3a can be extended horizontally and formed to be protruded on the upper end of the third stem 221-3.

The first diaphragm 222 air-tightly separates the valve chamber 212 into a first chamber 212-1 at the upper side thereof and a chamber of the remaining space excluding the first chamber 212-1, and can be located in the valve chamber 212 in order to be extended laterally across the valve chamber 212. Specifically, the first diaphragm 222 can be fixed to the central portion of the stem unit 221, and can be extended in the direction perpendicular to the movement direction of the stem unit 221 (such as the longitudinal direction or the horizontal direction of the stem unit). The first diaphragm 222 can be integrally coupled to the central portion of the stem unit 221 while penetrating the central portion of the stem unit 221 in the longitudinal direction thereof. The center portion of the first diaphragm 222 can be inserted into and joined to the central portion of the stem unit 221 with respect to the movement direction (the longitudinal direction, the vertical direction) of the stem unit 221. The center portion of the first diaphragm 222 can be inserted and joined between the first support end 221-1a and the second support end 221-3a. The edge portion of the first diaphragm 222 can be fixed to the valve body 210. The edge portion of the first diaphragm 222 and the valve body 210 can be air-tightly coupled with each other.

The second diaphragm 223 can air-tightly separate the valve chamber 212 into the second chamber 212-2 at the lower side thereof and a chamber of the remaining space excluding the second chamber 212-2. That is, the second diaphragm 223 can air-tightly separate the chamber of the remaining space excluding the first chamber 212-1 of the space of the valve chamber 212 into the second chamber 212-2 at the lower side thereof and the third chamber 212-3 at the center thereof. For this purpose, the second diaphragm 223 can be fixedly joined to the central portion of the stem unit 221 and can be extended horizontally toward the inner wall surface of the valve body 210 on the central portion of the stem unit 221.

The second diaphragm 223 can be integrally joined and coupled to the central portion of the stem unit 221 through the central portion of the stem unit 221. The center portion of the second diaphragm 223 can be inserted and joined between the second stem 221-2 and the third stem 221-3, and the edge portion of the second diaphragm 223 can be fixed into the valve body 210. The edge portion of the second diaphragm 223 can be fixed to the valve body 210 through a fixing body 224 provided in the valve body 210. The fixing body 224 can have a center hole 224a formed on the central portion thereof, and can be formed to be extended from the center hole 224a to the outside of the stem unit 221 (specifically, the outside of the joined portion of the second stem 221-2 and the third stem 221-3). The stem unit 221 can move vertically to open and close the nozzle 214 while penetrating the center hole 224a. The second diaphragm 223 is located to be spaced at a certain interval apart from the first diaphragm 222 in the movement direction (the vertical direction) of the stem unit 221, and the certain interval can be equal to the height of the third chamber 212-3 or slightly greater than the height of the third chamber 212-3.

The first diaphragm 222 and the second diaphragm 223 can be configured as a plate-like elastic sheet that can elastically flow vertically. The center portion of the first diaphragm 222 and the center portion of the second diaphragm 223 can vertically move together with the stem unit 221, and the edge portion of the first diaphragm 222 and the edge portion of the second diaphragm 223 maintain the state fixed to the valve body 210.

The first chamber 212-1 is a space that is gas-movably connected to the gas bypass hole 211, and can be air-tightly separated from the remaining space of the valve chamber 212 (the second chamber and the third chamber) by the first diaphragm 222. The first chamber 212-1 is an enclosed space except for the gas bypass hole 211.

The second chamber 212-2 is a space that is gas-movably connected to the gas discharge path 215 and is a space that is gas-movably connected to the nozzle 214 when the nozzle 214 is opened. The second chamber 212-2 is adjacent to the nozzle 214 to contact with the boundary thereof when the nozzle 214 is opened and can be gas-movably connected to the gas inflow path 213 that is extended to the nozzle 214 side. The third chamber 212-3 is an enclosed space that is surrounded by the first diaphragm 222 and the second diaphragm 223 inside the valve body 210. The internal pressure of the third chamber 212-3 can be set at atmospheric pressure. The hydrogen gas supplied to the nozzle 214 is discharged to the gas discharge path 215 via the third chamber 212-3 when the nozzle 214 is opened and passes through the gas discharge path 215 to be supplied to the hydrogen inlet of the fuel cell.

The first chamber 212-1 can be provided with a first spring member 241 for pressurizing and supporting the stem unit 221 in the direction of closing the nozzle 214, and the third chamber 212-3 can be provided with a second spring member 242 for pressurizing and supporting the stem unit 221 in the direction of opening the nozzle 214. The first spring member 241 can be interposed between the upper inner wall surface of the valve body 210 and the upper end surface of the first support end 221-1a, and the second spring member 242 can be interposed between the lower end surface of the second support end 221-3a and the upper end surface of the fixing body 224 (or the lower inner wall surface of the valve chamber). The spring force (the elastic restoring force) of the first spring member 241 can be canceled with the spring force of the second spring member 242 when the nozzle 214 is closed. That is, when the pressure (force) of the hydrogen gas supplied to the lower end of the nozzle opening/closing unit 220 (i.e., the bottom surface of the opening/closing sheet) through the nozzle 214 and the pressure (force) of the hydrogen gas flowed into the first chamber 212-1 through the gas bypass hole 211 and acting on the stem unit 221 is the same, the nozzle 214 is maintained to be closed by the sum (or a difference of the size) of the spring force of the first spring member 241 and the spring force of the second spring member 242.

The solenoid 230 can be installed on the outside upper portion of the valve body 210. The solenoid 230 generates a magnetic force when a current is supplied, and the direction and magnitude of the magnetic force are controlled according to the flow direction and magnitude of the current. The magnetic force generated by the solenoid 230 affects the stem unit 221 installed inside the valve body 210 (the valve chamber). The stem unit 221 can be pressurized and moved vertically (in the direction of opening and closing the nozzle) in the valve chamber 212 by the magnetic force. Accordingly, the direction and magnitude of the current supplied to the solenoid 230 can be controlled to determine the operating direction and magnitude of the magnetic force applied to the stem unit 221. Then, the direction and magnitude of the magnetic force can be controlled to adjust the pressure of the hydrogen inlet side of the fuel cell. In this time, a pressure sensor for measuring the pressure of the hydrogen inlet side of the fuel cell is not required.

The flow direction and magnitude of the current supplied to the solenoid 230 can be controlled by a controller. The controller can be one of the controllers mounted in the vehicle.

Herein, the force acting on the nozzle opening/closing unit 220 and the state of the second solenoid valve 200 thereby will be described with reference to FIGS. 6A to 6D.

Figure 6A:
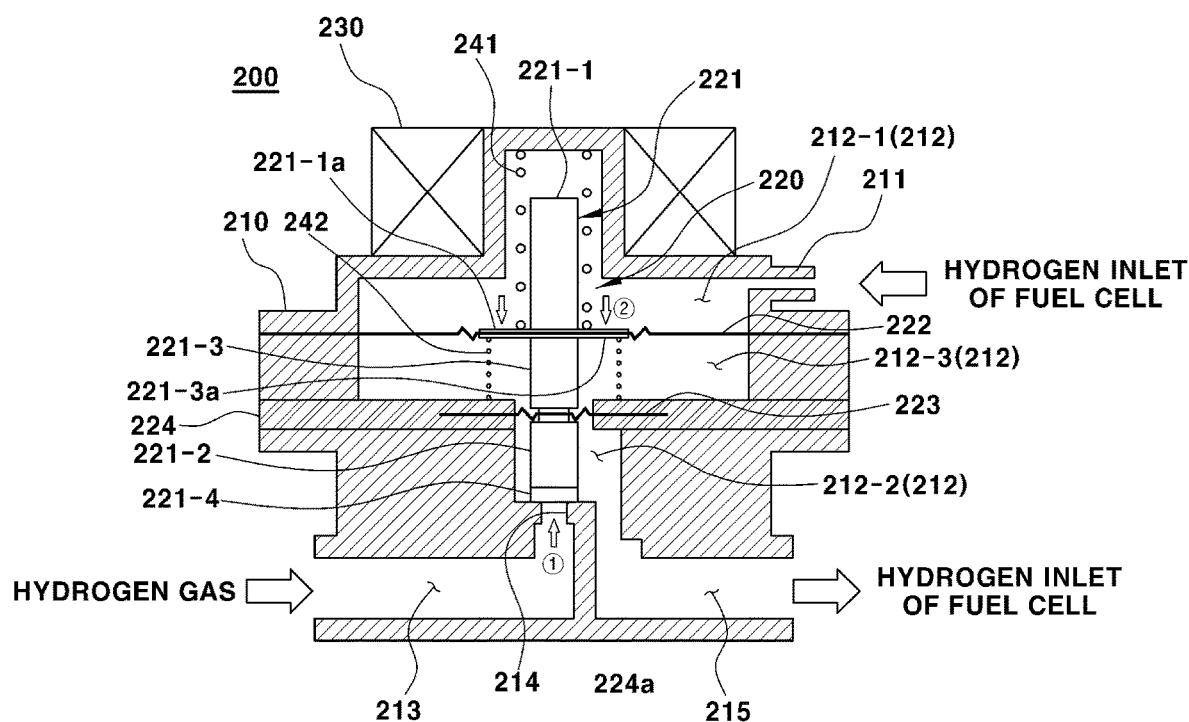
FIGS. 6A to 6D are diagrams illustrating a force acting on a nozzle opening/closing unit of the solenoid valve in the second form of the present disclosure.

First, when a current is not supplied to the solenoid 230 and a force of the hydrogen gas ① (hereinafter, referred to as 'a first force') supplied to the lower end of the nozzle opening/closing unit 220 (i.e., the bottom surface of the opening/closing sheet) through the nozzle 214 and a force of the hydrogen gas ② (hereinafter, referred to as 'a second force') flowed into the first chamber 212-1 through the gas bypass hole 211 and acting on the stem unit 221 are the same, the second solenoid valve 200 maintains the state that the nozzle 214 is closed by the sum of the spring force of the first spring member 241 and the spring force of the second spring member 242 (i.e., the difference in the magnitude of the spring force) (see FIG. 6A). The nozzle 214 can be kept closed until the magnitude of the first force ① exceeds the magnitude of the second force ②. The forces of the hydrogen gas ①, ② are determined as a value obtained by multiplying the pressure of the hydrogen gas by the area where the pressure acts.

Figure 6B:
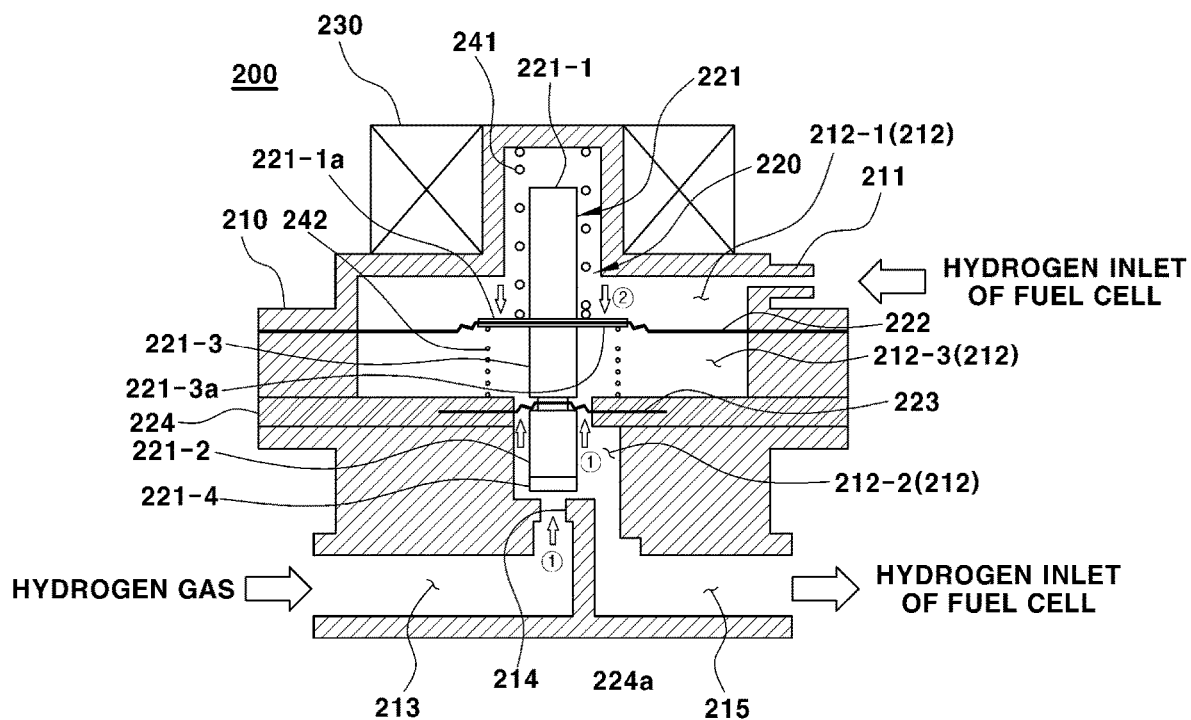

When a current is not supplied to the solenoid 230 and the first force ① increases to a value greater than the second force ② or the second force ② reduces to a value smaller than the first force ①, the second solenoid valve 200 can be configured so that the stem unit 221 moves upwards and the nozzle 214 is opened (see FIG. 6B). Then, the nozzle 214 is kept opened until the second force ② has the same magnitude as the first force ①. The first force ① acts on the bottom surface of the opening/closing sheet 221-4 and the lower surface of the second diaphragm 223 simultaneously while the nozzle 214 is opened. Accordingly, by reducing the bottom surface area of the second diaphragm 223 exposed to the outside of the stem unit 221 in the center hole 224a of the fixing body 224, it is possible to increase the accuracy in controlling the pressure of the hydrogen gas of the fuel cell to a target pressure. The lower surface area of the second diaphragm 223 exposed to the outside of the stem unit 221 can be set to a minimum value that can move vertically for opening and closing the nozzle 214 of the stem unit 221.

That is, when the force of the hydrogen gas acting on the nozzle opening/closing unit 220 in the first chamber 212-1 of the valve body 210 is smaller than the force of the hydrogen gas acting on the nozzle opening/closing unit 220 through the nozzle 214, the nozzle 214 can be closed or kept closed by a difference therebetween; and when the force of the hydrogen gas acting on the nozzle opening/closing unit 220 in the first chamber 212-1 is greater than the force of the hydrogen gas acting on the nozzle opening/closing unit 220 through the nozzle 214, the nozzle 214 can be opened or kept opened by a difference therebetween.

Figure 6C:
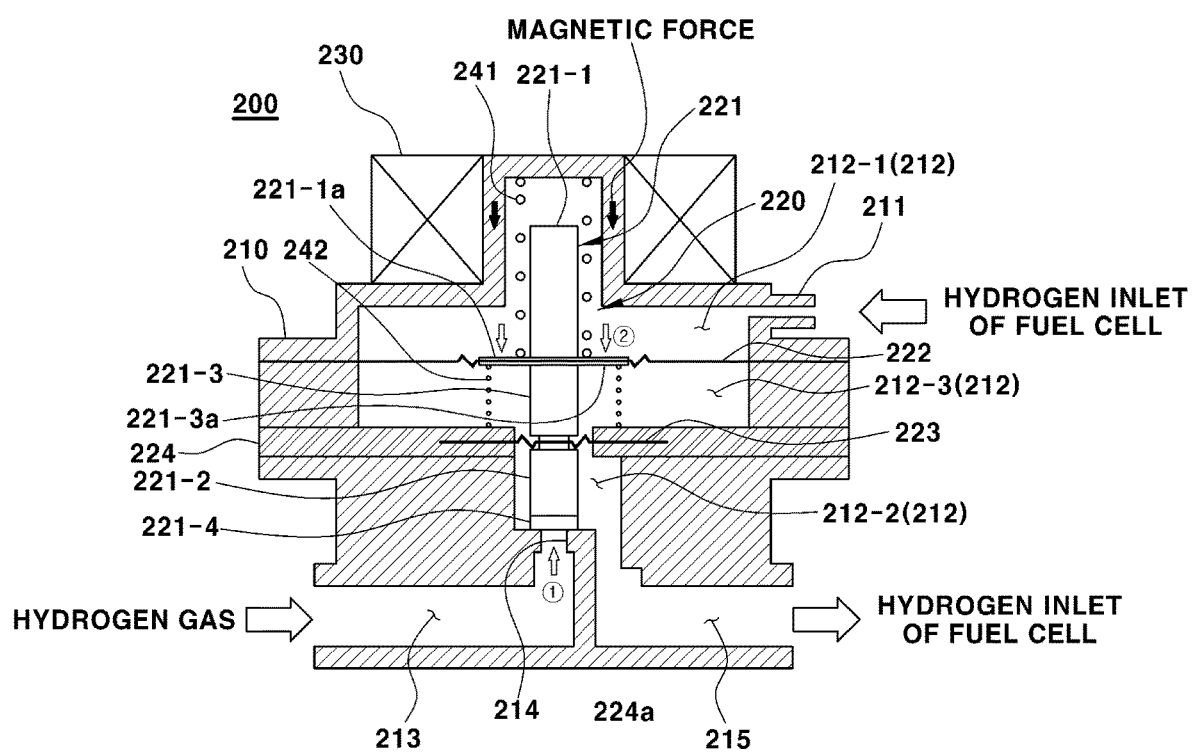

Meanwhile, when a current is supplied to the solenoid 230 in the direction for closing the nozzle 214 (the first direction), the solenoid 230 through which the current flows generates a magnetic force in the direction of closing the nozzle, and as a result, a force desired for opening the nozzle 214 becomes greater than before the current flows through the solenoid 230 (see FIG. 6C). Accordingly, the force of opening the nozzle 214 has to be at least greater than the sum of the second force ② and the magnetic force. As a result, the pressure of the hydrogen gas supplied from the gas inflow path 213 to the hydrogen inlet side of the fuel cell can be increased. That is, when a current is supplied to the solenoid 230 in the first direction in which the magnetic force in the direction of closing the nozzle 214 is generated, the pressure of the hydrogen gas supplied to the hydrogen inlet of the fuel cell can become greater than before the current is supplied to the solenoid 230.

Figure 6D:
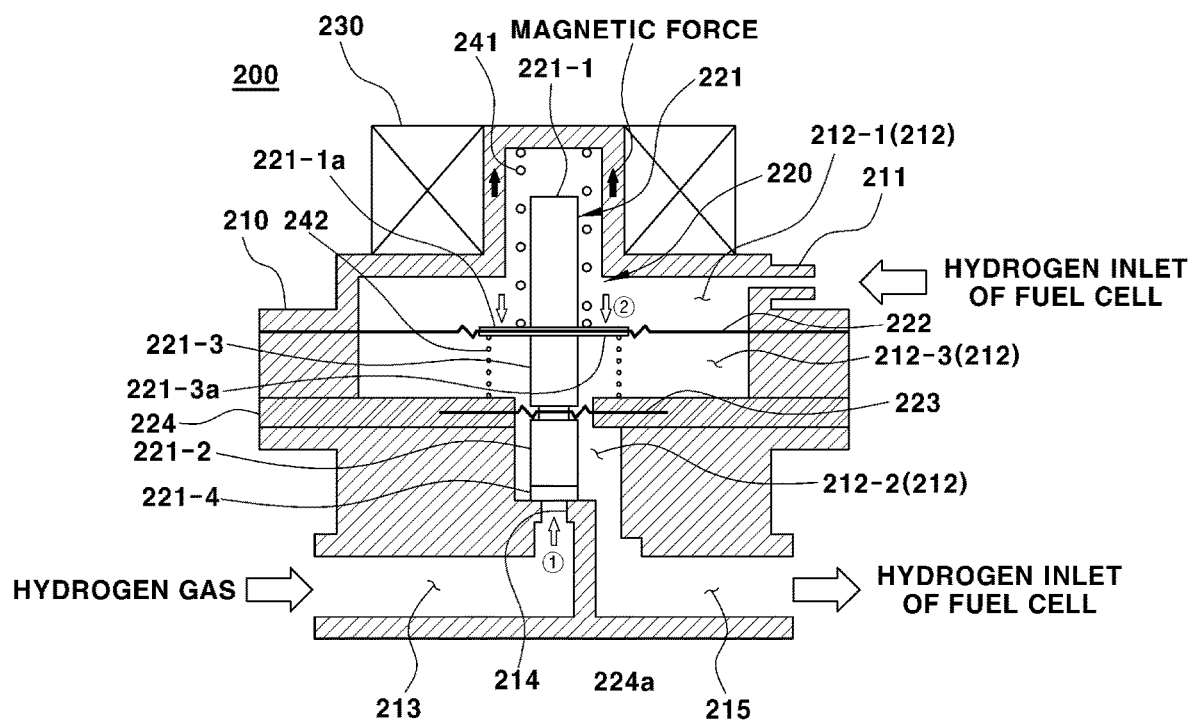

In addition, when a current is supplied to the solenoid 230 in the direction for opening the nozzle 214 (the second direction), the solenoid 230 through which the current flows generates a magnetic force in the direction of opening the nozzle 214, and as a result, a force desired for opening the nozzle 214 becomes smaller than before the current flows through the solenoid 230 (see FIG. 6D). That is, when the current supplied to the solenoid 230 is supplied in the second direction for generating the magnetic force in the direction of opening the nozzle 214, the pressure of the hydrogen gas supplied to the hydrogen inlet of the fuel cell can become smaller than before the current is supplied to the solenoid 230.

Then, the magnitude of the current (the current in the first direction or the second direction) supplied to the solenoid 230 can be controlled to adjust the increase/decrease value of the pressure of the hydrogen inlet.

The second solenoid valve 200 is configured so that the force of the hydrogen gas supplied to the nozzle 214 side through the gas inflow path 213 acts on the nozzle opening/closing unit 220 in the direction of opening the nozzle 214, and at the same time, the force of the hydrogen gas flowed into the first chamber 212-1 through the pass bypass hole 211 acts on the nozzle opening/closing unit 220 in the direction of closing the nozzle 214, and accordingly, when the pressure of the hydrogen inlet side of the fuel cell is reduced, the nozzle 214 is opened and the pressure of the hydrogen inlet side is increased, the nozzle 214 is closed; and when the direction and magnitude of the current supplied to the solenoid 230 based on the above configuration are controlled, the pressure of the hydrogen gas supplied to the hydrogen inlet can be automatically controlled to a desired target pressure. In addition, the second solenoid valve 200 can control the direction and magnitude of the current supplied to the solenoid 230, thus increasing or decreasing the pressure of the hydrogen inlet of the fuel cell. Accordingly, the gas pressure of the hydrogen inlet can be controlled to a desired target pressure without using a pressure sensor for detecting the pressure of the hydrogen inlet.

For example, when the magnitude and direction of the current supplied to the solenoid 230 to meet the target pressure is controlled after monitoring the pressure of the air inlet of the fuel cell and calculating the target pressure of the hydrogen inlet of the fuel cell based on the pressure of the air inlet, the pressure of the hydrogen inlet can be controlled to the target pressure.

In the conventional fuel cell system, the controller has monitored the pressure of the hydrogen inlet and then has controlled the opening/closing of the solenoid valve based on the monitored pressure of the hydrogen inlet to control the pressure of the hydrogen inlet to the target pressure. In this time, monitoring the pressure sensor installed at the hydrogen inlet is a basis for controlling the pressure of the hydrogen inlet, and when the pressure sensor fails, the pressure of the hydrogen inlet cannot be controlled to the target pressure, such that the fuel cell system cannot be normally operated.

The second solenoid valve 200 of the present disclosure can be configured so that the nozzle 214 is automatically opened and closed by a balance and a difference between the force of the hydrogen gas acting on the nozzle opening/closing unit 220 in the direction of closing the nozzle 214 and the force of the hydrogen gas acting on the nozzle opening/closing unit 220 in the direction of opening the nozzle 214, thus controlling the pressure of the hydrogen gas of the fuel cell to the target pressure without the pressure sensor, and in addition, can control the magnetic force of the solenoid 230 supplied to the nozzle opening/closing unit 220, thus changing the target pressure as desired.

Accordingly, even if a production deviation occurs in the second solenoid valve 200 and the regulator for regulating the pressure of the hydrogen gas supplied to the valve 200, the valve 200 regulates the gas pressure supplied to the hydrogen inlet of the fuel cell, and as a result, it is possible to prevent unintended gas leak from occurring between the nozzle 214 and the opening/closing sheet 221-4 due to the production deviation of the regulator.

As described above, while the forms of the present disclosure have been described in detail, the scope of the present disclosure is not limited thereto, and various modifications and improvements by those skilled in the art using the basic concept of the present disclosure defined in the following claims is also included in the scope of the present disclosure.

What is claimed is:

1. A solenoid valve for controlling gas supply, the solenoid valve comprising:
    a valve body including:
        a nozzle configured to discharge gas flowed in through a gas inflow path to a gas usage device, and
        a valve chamber adjacent to the nozzle;
    a nozzle opening/closing unit movably installed in the valve chamber in a direction of opening the nozzle, and configured to divide the valve chamber into a first chamber configured to maintain communication with the gas inflow path and a second chamber configured to selectively communicate with the nozzle;
    a gas bypass hole formed on the valve body and configured to cause communication between the gas inflow path and the first chamber; and
    a solenoid configured to selectively provide an operating force of the nozzle opening/closing unit for opening the nozzle,
    wherein the nozzle opening/closing unit comprises:
        a stem unit movably installed in the valve chamber by receiving the operating force for opening the nozzle from the solenoid;
        a diaphragm located on a central portion of the stem unit, formed to be extended in a direction perpendicular to a movement direction of the stem unit, and configured to divide the valve chamber into the first chamber and the second chamber; and an opening/closing sheet fixed to an end portion of the stem unit, and configured to close the nozzle when the operating force received from the solenoid is removed and the stem unit moves in a direction of closing the nozzle, and wherein:

a surface area of the diaphragm where a gas pressure of the first chamber acts is equal to or greater than a surface area of the opening/closing sheet where a gas pressure of the nozzle acts such that a hydrogen leak between the nozzle and the opening/closing sheet is prevented regardless of occurrence of a diameter error of the nozzle, and the surface area of the opening/closing sheet where the gas pressure of the nozzle acts is the same as a cross-sectional area of the nozzle.

2. The solenoid valve of claim 1, wherein a spring member configured to always provide an operating force of the nozzle opening/closing unit for closing the nozzle is interposed between the valve body and the nozzle opening/closing unit.

3. The solenoid valve of claim 1, wherein the diaphragm is joined to the central portion of the stem unit by penetrating the stem unit.

4. The solenoid valve of claim 1, wherein the stem unit comprises a first stem and a second stem that are joined with the diaphragm interposed therebetween.

5. The solenoid valve of claim 1, wherein the first chamber is an enclosed type chamber that is communicated with the gas inflow path through the gas bypass hole.

6. The solenoid valve of claim 1, wherein the surface area of the diaphragm where the gas pressure of the first chamber acts is equal to or greater than an amount of increase of the cross-sectional area of the nozzle based on a diameter maximum error of the cross-sectional area of the nozzle.

7. The solenoid valve of claim 1, wherein the diaphragm has an edge portion fixed to the valve body by a fixing body installed on the valve body, and a central portion of the diaphragm is integrally movable with the stem unit while penetrating a center hole formed on the fixing body.

8. The solenoid valve of claim 1, wherein the diaphragm is a plate-type elastic member that is deformable in response to the movement of the stem unit.

9. A solenoid valve for controlling gas supply, the solenoid valve comprising:

a valve body including:

a nozzle configured to receive gas and discharge gas to a gas inlet of a gas usage device, and a valve chamber adjacent to the nozzle;

a nozzle opening/closing unit movably installed in the valve chamber in a direction of opening the nozzle;

a first diaphragm configured to divide the valve chamber into a first chamber communicating with the gas inlet and a second chamber;

a gas bypass hole formed on the valve body, and configured to provide gas supplied from the gas inlet to the first chamber; and a solenoid installed on the valve body, and configured to provide a magnetic force configured to move the nozzle opening/closing unit when a current is supplied, wherein the nozzle opening/closing unit comprises a second diaphragm configured to divide the second chamber into a third chamber and a fourth chamber, the third chamber is selectively communicated with the nozzle, and the fourth chamber is interposed between the first chamber and the third chamber, and wherein the first chamber is provided with a first spring member configured to press the stem unit in the direction of closing the nozzle, and the fourth chamber is provided with a second spring member configured to press the stem unit in the direction of opening the nozzle.

10. The solenoid valve of claim 9, wherein the nozzle opening/closing unit comprises:

a stem unit configured to receive a magnetic force from the solenoid, and configured to be pressurized in a direction of opening the nozzle by the gas supplied to the nozzle, and to be pressurized in a direction of closing the nozzle by the gas supplied to the first chamber, and wherein the first diaphragm is located on a center of the stem unit.

11. The solenoid valve of claim 9, wherein the first chamber is an enclosed space that is communicated with the gas bypass hole.

12. The solenoid valve of claim 9, wherein the fourth chamber is an enclosed space that is surrounded by the first diaphragm and the second diaphragm inside the valve body.

13. The solenoid valve of claim 10, wherein the first diaphragm and the second diaphragm are located on the center of the stem unit with respect to a movement direction of the stem unit.

14. The solenoid valve of claim 13, wherein the second diaphragm is located to be spaced at a certain interval apart from the first diaphragm with respect to the movement direction of the stem unit, and an edge portion of the first diaphragm and an edge portion of the second diaphragm are fixed to the valve body.

15. The solenoid valve of claim 10, wherein a direction and a magnitude of the magnetic force supplied to the stem unit are determined by controlling a direction and a magnitude of the current supplied to the solenoid.

* * * * *